United States Patent
Stephan et al.

(10) Patent No.: US 7,360,747 B2
(45) Date of Patent: Apr. 22, 2008

(54) HOLDER FOR A FOOD OR DRINK CONTAINER, AND MOTOR VEHICLE HAVING SUCH A HOLDER

(75) Inventors: Friedrich Stephan, Hemmingen (DE); Martin Frank, Muehlacker (DE); Andreas Schneider, Freudenstadt (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 406 days.

(21) Appl. No.: 11/091,776

(22) Filed: Mar. 29, 2005

(65) Prior Publication Data
US 2005/0225112 A1    Oct. 13, 2005

(30) Foreign Application Priority Data
Mar. 30, 2004   (DE) ................. 10 2004 015 347

(51) Int. Cl.
*A47K 1/08* (2006.01)
(52) U.S. Cl. ................. 248/311.2; 224/281; 224/282; 224/926
(58) Field of Classification Search ............. 248/311.2; 296/37.12; 292/341.17, DIG. 4; 224/483, 224/282, 826, 281, 926
See application file for complete search history.

(56) References Cited

U.S. PATENT DOCUMENTS

| | | | | |
|---|---|---|---|---|
| 4,955,571 A | * | 9/1990 | Lorence et al. | ........... 248/311.2 |
| D328,730 S | * | 8/1992 | Kapp | .................. D12/419 |
| 5,680,974 A | * | 10/1997 | Vander Sluis | ............... 224/281 |
| 6,019,334 A | | 2/2000 | Shinomiya | |
| 6,409,061 B1 | * | 6/2002 | Fischer et al. | ............... 224/281 |
| 6,830,277 B2 | * | 12/2004 | Zierle et al. | ............. 296/37.12 |
| 2001/0023872 A1 | | 9/2001 | Schierling et al. | |

FOREIGN PATENT DOCUMENTS

| | | |
|---|---|---|
| DE | 100 15 197 A1 | 10/2001 |
| DE | 198 20 511 C2 | 1/2002 |
| EP | 1 138 549 A2 | 10/2001 |
| EP | 1 300 282 A1 | 4/2003 |
| JP | 6-115390 A | 4/1994 |
| JP | 2002-29303 A | 1/2002 |

OTHER PUBLICATIONS

German Office Action dated Apr. 12, 2007 (Six (6) Pages).
European Search Report dated Sep. 14, 2007 w/English translation of pertinent portion (four (4) pages).

* cited by examiner

Primary Examiner—Amy J. Sterling
(74) Attorney, Agent, or Firm—Crowell & Moring LLP

(57) ABSTRACT

A holder for a food or beverage container includes a housing having an opening, a holding arm having a retracted position, and a multipartite mask arrangement associated with the housing opening. The multipartite mask arrangement includes a plurality of masks mounted for movement on the housing, and the masks are movable independently of one another from an open position uncovering the housing opening to a closed position closing the housing opening. The holding arm includes a receiver for the container and is received in the housing in the retracted position. The mask arrangement closes the housing opening when the holding arm is at the retracted position, and at least partially uncovers the housing opening for a deployment of the holding arm.

25 Claims, 4 Drawing Sheets

HOLDER FOR A FOOD OR DRINK CONTAINER, AND MOTOR VEHICLE HAVING SUCH A HOLDER

This application claims the priority of DE 10 2004 015 347.7, filed Mar. 30, 2004, the disclosure of which is expressly incorporated by reference herein.

BACKGROUND AND SUMMARY OF THE INVENTION

The invention relates to a holder for a food or drink container in the interior of a motor vehicle, and to a motor vehicle with such a holder.

DE 198 20 511 C2 discloses a holder for a food or drink. In a housing, in a position of rest and in a retracted position, respectively, a holding arm is held, having a receptacle for a container. The holding arm can be swung out of a housing opening to a deployed position which is the position of use. Furthermore, a mask of a masking system is fastened to the holding arm so that the mask moves together with the holding arm. The masking system is multipartite and thus, in addition to the mask fixedly applied to the holding arm, it has another mask held tightly and unmovably on the housing. In the retracted position of the holding arm, the mask arrangement sometimes completely closes the housing opening, and in the deployed position a portion of this housing opening is uncovered by the mask fastened to the holding arm, and the holding arm is swung outwardly through this housing portion. The other part of the opening is always fixedly closed by the mask affixed to the housing:

U.S. Pat. No. 6,019,334 discloses a cupholder in which the container-receiving element is made stationary. An opening of the cup-shaped receiving element is covered by a masking system which is made bipartite and the masks being held for pivoting on the receiving element. The pivot axes of the two masks are parallel and spaced apart from one another. To release the opening, one of the masks is folded up manually and the other mask is driven in the opening direction and reverse by a positive coupling by means of a lever.

An object of the invention is to provide a holder which is easy to operate and visually attractive or a motor vehicle having such a holder.

This object is achieved by a holder for a food or beverage container, wherein the holder includes a housing having an opening, a holding arm having a retracted position, and a multipartite mask arrangement associated with the housing opening. The multipartite mask arrangement includes a plurality of masks mounted for movement on the housing, and the masks are movable independently of one another from an open position uncovering the housing opening to a closed position closing the housing opening. The holding arm includes a receiver for the container and is received in the housing in the retracted position. The mask arrangement closes the housing opening when the holding arm is at the retracted position, and at least partially uncovers the housing opening for a deployment of the holding arm. The object is also achieved by a motor vehicle having such a holder.

The advantages mainly achieved by the invention include that, due to the movable mounting of the masks, the housing opening can be completely freed for the deployment of the holding arm, and that thereafter one of the masks—due to the ability of the masks to move independently of one another in a first direction—can be brought back to the closing position, so that the housing opening can be reclosed partially and thus a visually attractive appearance is achieved. The other mask, however, can remain in the open position and leave free a portion of the housing opening through which the holding arm reaches out of the housing to its deployed position or position of use.

In a preferred embodiment, in which the masks are coupled together for movement in their second movement direction, so that the opening of one mask also opens the other mask, so that the housing opening is unmasked for the movement of the holding arm to the deployed position, which additionally simplifies the operation of the holder.

In another preferred embodiment of the invention, a wide housing opening is unmasked which is desirable especially for turning out a holding arm having a corresponding length.

In a further preferred embodiment, a simple and economically advantageous configuration of a coupling system for the masks is made available.

A still another preferred embodiment includes a secure mounting of the holding arm in the deployed system.

According to yet another embodiment, a "coasting" action of the mask is achieved, so that the holding arm can be returned fully into the housing and only then—preferably automatically, by spring force for example—can the mask be brought back to the closed position.

In an especially easy operation of the holder, the mask is automatically brought into the open position when the latched closed position is undone. For this purpose the mask can be held in the closed position, by a so-called and known push-push device for example. By simply pressing the mask, the mask is driven by its bias to the open position and at the same time brings the other mask with it.

Preferred is another embodiment of the holding device, according to which two holding systems, each with a receiving element, are provided so that inside of the motor vehicle both the driver and the passenger have a place to set down a container.

Other objects, advantages and novel features of the present invention will become apparent from the following detailed description of the invention when considered in conjunction with the accompanying drawings.

BRIEF DESCRIPTION OF THE DRAWINGS

The invention is further explained hereinafter with the aid of embodiments with reference to the drawing, wherein.

DETAILED DESCRIPTION OF THE DRAWINGS

Figure 1:
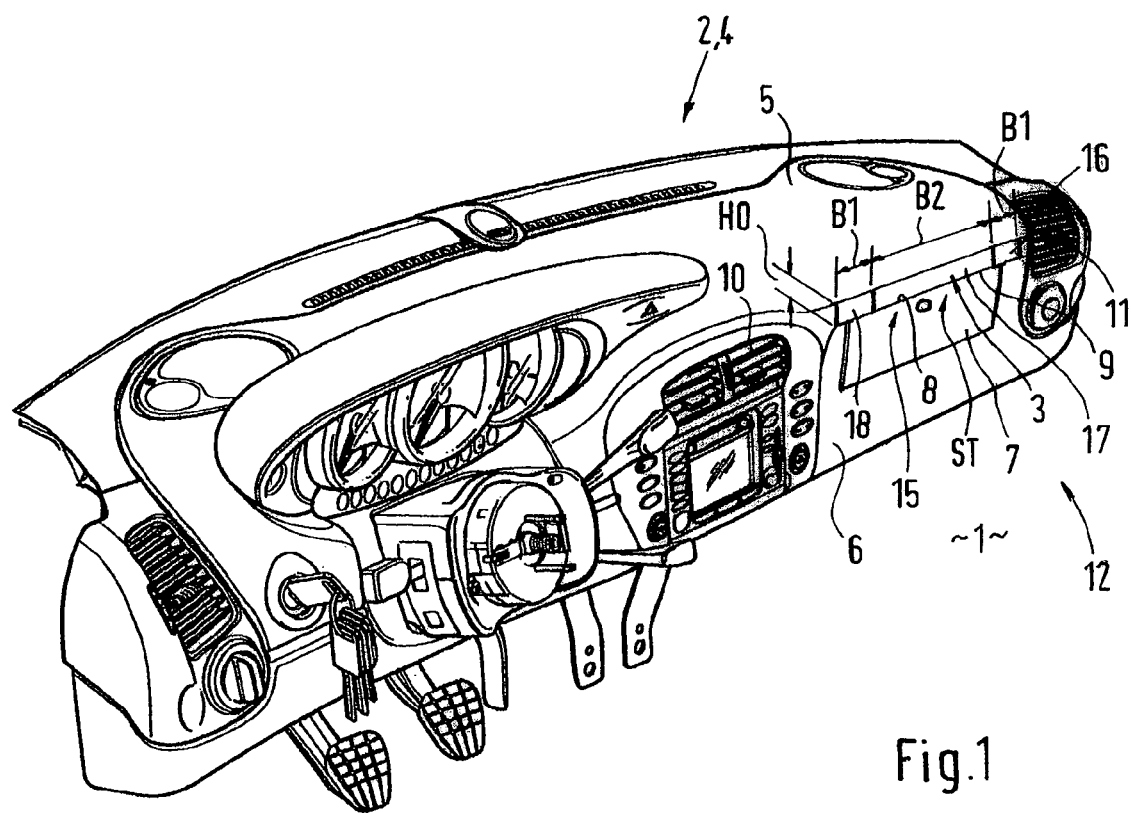
FIG. 1 shows an interior equipment section with a holder inserted therein for a food and/or beverage container with a mask system in the closed position.

FIG. 1 illustrates an interior equipment part 2 of an interior space 1 of an automobile, especially a motor vehicle, in which a holding device 3 (or a cupholder) is inserted. The interior equipment part 2 is formed by an instrument panel 4 having an upper part 5 and a lower part 6 between which the holding device 3 is arranged. The instrument panel 4 has a glove box of which only the cover 7 is shown, whose upper margin 8 reaches the underside 9 of the holding device 3. Consequently, the holding device 3 is between the glove box and the top 5 of the instrument panel 4 and furthermore so located that it lies between two air outlets 10 and 11 of an air controlling system, for the interior space 1. The air outlet 10 is a so-called middle outlet and air outlet 11 a so-called side outlet, which is on the right in the forward running direction of the motor vehicle. Accordingly, the holding device 3 is associated with the passenger side 12 of the motor vehicle.

Figure 3:
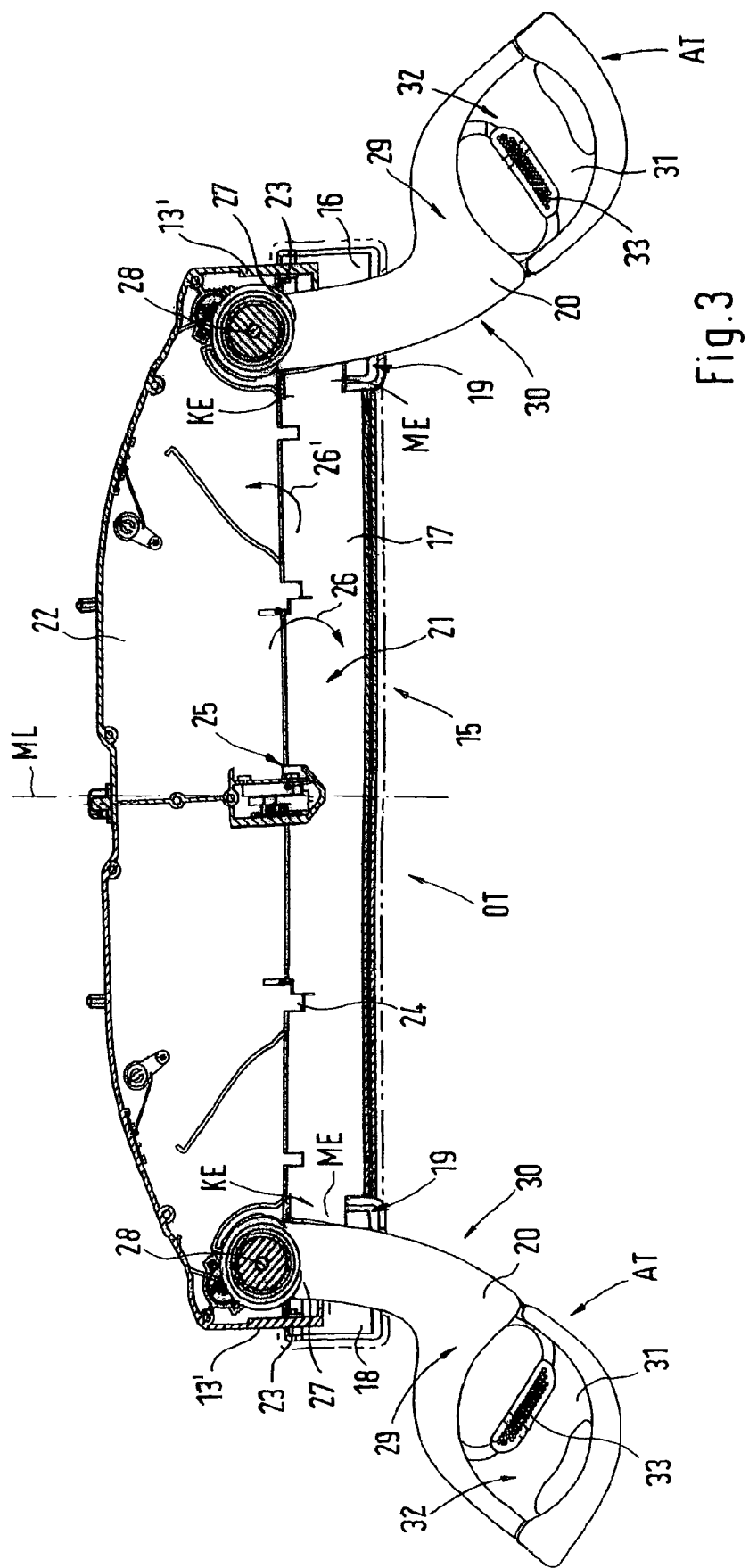
FIG. 3 shows the holding device of FIG. 2 with container holding arms in the deployed position.
Figure 4:
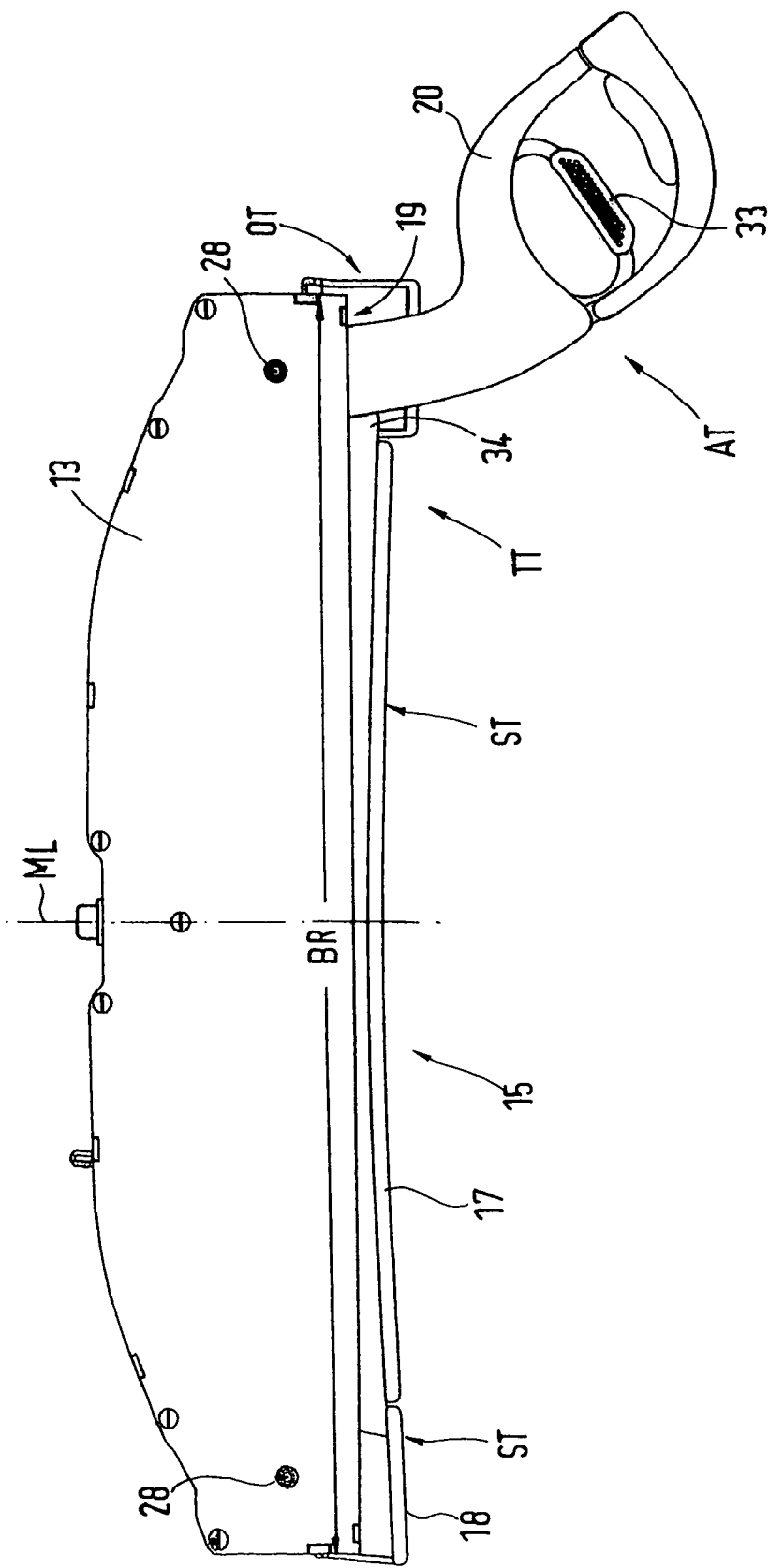
FIG. 4 shows the holding device with one of the holding arms in the deployed position and the mask system partially closed.

The holding device 3 has a housing 13 with an opening 14 which can be closed with a multipartite mask arrangement 15 and can be opened at least partially. In FIG. 1 the mask arrangement 15 is in the closed position ST and closes the housing opening 14, and in FIGS. 2 and 3 the mask arrangement 15 is shifted to the open position OT. In FIG. 4 the mark arrangement 15 assumes a partly open position TT in which the width of the housing opening 14 is partly closed.

The mask arrangement 15 comprises at least two masks 16 and 17. In the embodiment shown three masks 16, 17 and 18 are provided, which can be shifted to the closed position ST, the open position OT and to at least the partly open position TT shown in FIG. 4. In the partly open position TT a first partial opening 19 in housing opening 14 is uncovered by the first mask 16 through which a holding arm 20, described further below, extends out of the housing 13. A second partial opening 21 in the housing opening 13 is closed or released by the second mask 17. If only one holding device 3 with a single holding arm is made available, these two masks are sufficient. In the case to be seen of holding device 3, two holding arms 20, and accordingly for holding arm 20 two first partial openings 19 are provided, between which is the second partial opening is located. The mask 16 is associated with the first partial opening 19, mask 18 with the second first partial opening 19, and mask 17 with the second partial opening 19.

The holding device 3 is in mirror-image symmetry with the center long axis ML, which lies in the plane of drawing in the figures. Therefore in what follows only one-half of the holding device 3 with the masks 16 and 17 as well as the right holding arm 20 is described. The masks 16, 17, are journaled on the housing 13, preferably at the housing bottom 22, on horizontal axes 23 and 24 which are in line with one another. The middle mask 17 is held in its closed position ST, for example by a so-called push-push mechanism 25 which can be provided centrally on the housing 13. Pushing on the mask 17 releases it from its catch through the push-push mechanism and can thus be automatically changed from the closed position ST to the open position OT, preferably by spring force or bias. In its closed position ST the mask 17 can thus be biased, by a spring, for example, in the direction 26 of the open position OT, so that the mask 17, after its release by the push-push mechanism 25, will be automatically shifted to the open position OT. In this direction of movement 26, the mask 16 or 18 is coupled with the mask 17 for movement through a coupling arrangement KE, so that mask 16 or 18 is carried by mask 17 into the open position OT, so that the housing opening 14 with partial openings 19 and 21 is uncovered. The coupling arrangement KE comprises a driver ME projecting laterally over the mask 17 associated with partial opening 21, which loosely reaches behind mask 16 or 18, as the case may be, and thus drives it in the direction of movement 26 to the open position OT. In the other direction of movement 26' in which the masks 16, 17 and 18 are brought from the open position OT to the closed position ST, the coupling arrangement KE is inactive so that the middle mask 17 can be shifted to the closed position ST without carrying with it the side masks 16 or 18, so that the masks 16, 17 and 18, lying side by side, can be moved independently of one another in the direction of movement 26'. By definition, direction 26' is the first and direction 26 the second direction of movement.

The holding arm 20 is journaled at its one end within the housing 13, preferably adjacent to a lateral housing wall 13', in a vertical pivot axis 28. At its other, free end 29, the holding arm 20, configured as a curved arm 30, has a ring-like receiver 31 which has an opening 32 for a container. If desired, the receiver 31 can have a foot piece 33 which can be turned in and out on the holding arm 20 or receiver 31, and preferably is driven automatically and positively by a mechanical control mechanism according to an inward movement position ET and an outward movement position AT of the holding arm 20. In the inward movement position ET the holding arm 20 is received in the housing with its foot piece 33 retracted, and by a movement about the pivot axis 28 can be changed to its starting position AT, if previously the masks 16 and 17, as described above, have been brought to the open position OT. In the movement into the deployment position AT the foot piece 33 is folded out.

With the holding arm 20 in the starting-out position, the mask 17 can be brought in the first direction of movement 26' back to the closed position ST, while mask 16 remains in its open position OT since the coupling arrangement KE is inactive in the first direction of movement 26' and mask 17 can be moved independently of mask 16. The middle partially opening 21 of the housing opening 14 is thus closed and partial opening 19 remains open.

Figure 2:
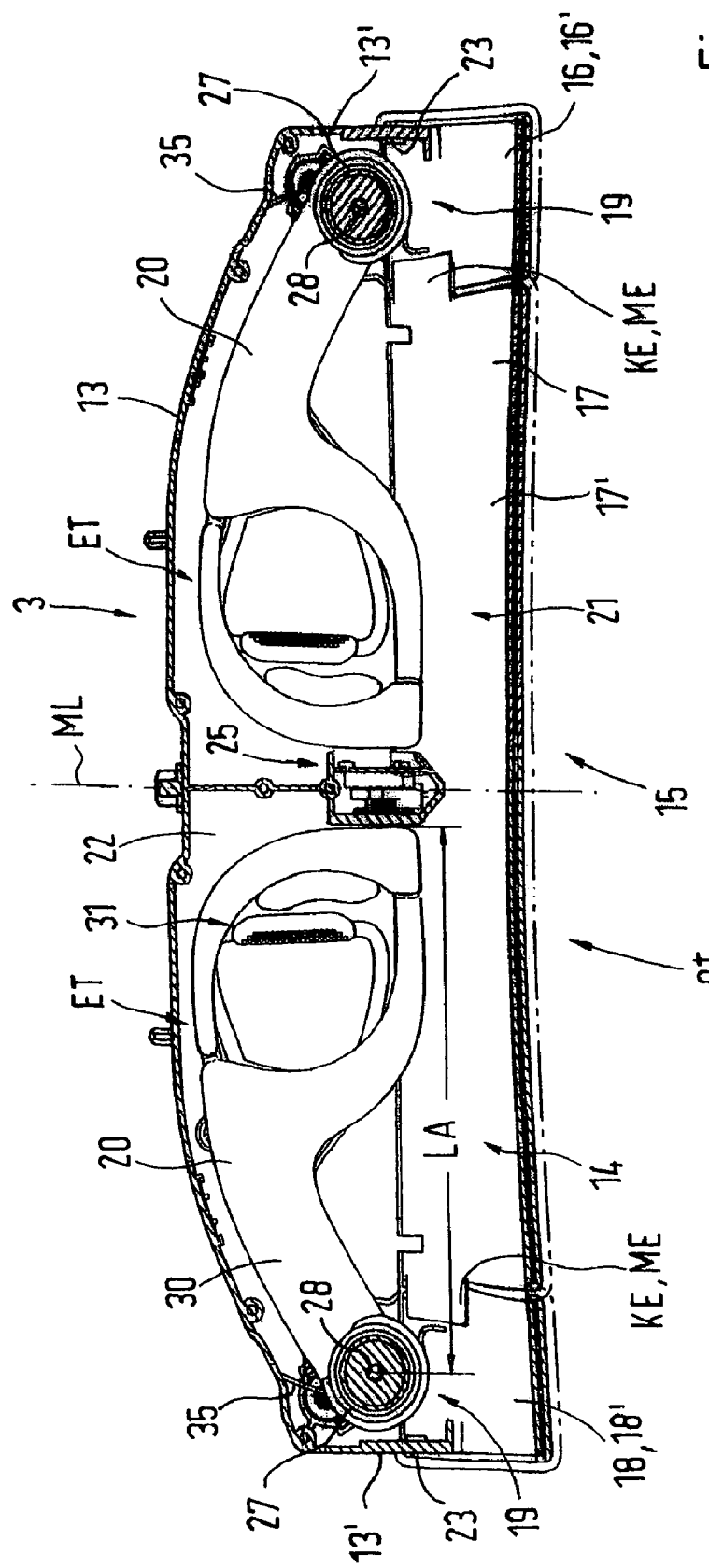
FIG. 2 shows the holding device of FIG. 1 in a partial section with a mask system in the open position and holding arms arranged in the retracted position.

The side masks 16 and 18 each have—as seen in the direction of the opening width BR of the housing opening— substantially less width B1 than the middle mask 17 which has a mask width B2. The opening widths of the first and second partial openings 19 and 21 are dimensioned accordingly. In addition to their different width B1 and B2, the masks 16, 17 and 18 have the same height HO. As shown in FIG. 3, masks 16 and 18 are each associated with one of the partial openings 19, which are such in their width that the holding arm 20 in each case can reach with its curved arm 30 in the deployed position AT as shown in FIG. 4 and can pass through the partial opening 19, even when the middle mask 17 is in the closed position ST. If the entire mask arrangement 15 is opened, as shown in FIGS. 2 and 3, the holding arm or arms 20 can be brought about the corresponding pivot axes 28 through the corresponding housing opening 14 into the deployed position AT. The width B2 of the mask 17 is consequently such that the deployment of the holding arm 20 through the partial openings 19 and 21 is possible. Taken together, the widths B1 and B2 determine at least the length LA of the holding arm 20 with its curved arm 30 and its receiver 31.

If mask 17 of the second partial opening 21 is closed, the holding arm 20 is in the deployed position AT and mask 16 is opened, the mask 17 forms, especially by the driver ME, a locking arrangement 34 for the holding arm and blocks its movement about the axis 28, so that it is fixed in the deployed position AT and cannot be moved in the retracted position ET until the mask 17 is moved back into its open position OT. The holding arm 20 holds the mask 16 and/or 18 in the deployed position AT, so that the mask remains in the open position OT until the holding arm 20 is brought manually, if mask 17 is open, back to the retracted position ET. A force, a spring for example, urges the mask 16 or 18 in its first direction of movement 26', so that the mask 16 or 18 is moved automatically by this force to the closed position ST. This force can be built up or produced by the opening of mask 16 in direction of movement 26 when the spring is biased. Preferably, for the opposite direction of movement 26' of mask 16 or 18, a damping mechanism (not shown) is provided which causes a retarded closing or slowing of the mask 16 or 18, by which the mask 16 or 18 is not closed until the holding arm 20 has virtually or completely reached its retracted position ET. The damping mechanism can be in the form of a brake which is connected to mark 16 or 18 by a lever.

In the embodiment of the holder 3 with two holding arms 20, which are oppositely shifted in the direction from the retracted position ET to the deployed position AT and are urged by an appropriate force, for example by a spring 36 placed around the pivot axis 28, are, as mentioned, the three masks 16, 17 and 18, so that the middle mask 17 forms a center mask 17' and the two side masks 16 and 18 form the lateral mask 16' and 18', respectively. The center mask 17' has the lock 34 and the coupler KE for both of the lateral masks 16' and 18'.

It is also to be mentioned that the holding arms or arms 20, when in the retracted position ET, can be held within the housing 13 by a snap fastening mechanism, for example by an additional push-push mechanism. By releasing this fastening mechanism the holding arm 20 is then driven by spring 35 into the deployed position AT.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A holder for a food or beverage container, comprising:
   a housing having an opening; at least one holding arm having a retracted position, wherein the at least one holding arm is received in the housing in the retracted position, the at least one holding arm including a receiver for the container; and
   a multipartite mask arrangement mounted on the housing so as to be associated with the housing opening, wherein the mask arrangement closes the housing opening when the at least one holding arm is at the retracted position, and at least partially uncovers the housing opening for a deployment of the at least one holding arm, and wherein the multipartite mask arrangement comprises three side-by-side masks mounted for movement on the housing, and the masks are pivotably movable independently of the at least one holding arm and of one another about coaxial pivot shafts from an open position uncovering the housing opening to a closed position closing the housing opening.

2. The holder according to claim 1, wherein the masks are coupled for movement in a direction from the closed position to the open position.

3. The holder according to claim 1, further comprising a coupling arrangement that couples the masks for the movement in the second direction.

4. The holder according to claim 3, wherein the coupling arrangement includes a driver disposed on one of the masks for moving the other masks.

5. The holder according to claim 4, wherein the housing opening includes a first partial opening with which one of the masks is associated, said first partial opening having a width such that the at least one holding arm in a deployed position can pass through the first partial opening, and wherein the housing opening includes a second partial opening with which another one of the masks is associated, wherein the second partial opening of the housing opening, together with the first partial opening, has a width such that the at least one holding arm with its receiver is shiftable from the retracted position to the deployed position.

6. The holder according to claim 5, wherein the mask that is associated with the first partial opening has a width which is substantially less than the width of the other mask.

7. The holder according to claim 6, wherein the driver of the coupling arrangement is disposed on the mask for the second partial opening.

8. The holder according to claim 7, wherein, in the deployed position of the at least one holding arm, the mask, which is associated with the second partial opening, forms a locking arrangement for the at least one holding arm when this mask is in its closing position closing the housing opening at least partially.

9. The holder according to claim 8, wherein the mask that is associated with the first partial opening, starting out from its opening position, is moveable against a damping mechanism to its closing position whenever the at least one holding arm is brought from its deployed position to its retracted position.

10. The holder according to claim 9, wherein the mask which is associated with the second partial opening, is held by snap fastening in the closed position and is biased in its second direction of movement, the bias force being selected such that this mask carries the other mask toward the opening position.

11. The holder according to claim 10, further comprising a second holding arm having a receiver, wherein the housing receives the two holding arms, the housing opening has another first partial opening with which the third of the three masks is associated, the second partial opening is disposed between the two first partial openings, and the mask associated with the second partial opening is disposed between the masks for the first partial openings.

12. The holder according to claim 11, wherein the mask associated with the second partial opening has the coupling arrangement for the masks for the first partial openings and has the locking arrangement for the holding arms.

13. A motor vehicle, comprising the holder according to claim 12.

14. The motor vehicle according to claim 13, wherein the holder is disposed in a dashboard of the motor vehicle, wherein the holder lies laterally beside an air outlet of an air treatment unit, and wherein in the deployed position of the holding arms at least the receivers are each arranged in front of one of the air outlets.

15. The holder according to claim 1, wherein the coupling arrangement includes a driver disposed on one of the masks for moving the other masks.

16. The holder according to claim 1, wherein the housing opening includes a first partial opening with which one of the masks is associated, said first partial opening having a width such that the at least one holding arm in a deployed position can pass through the first partial opening, and wherein the housing opening includes a second partial opening with which another one of the masks is associated, wherein the second partial opening of the housing opening, together with the first partial opening, has a width such that the at least one holding arm with its receiver is shiftable from the retracted position to the deployed position.

17. The holder according to claim 16, wherein the mask that is associated with the first partial opening has a width which is substantially less than the width of the other mask.

18. The holder according to claim 15, wherein the driver of the coupling arrangement is disposed on the mask for the second partial opening.

19. The holder according to claim 1, wherein, in the deployed position of the at least one holding arm, the mask, which is associated with the second partial opening, forms a locking arrangement for the at least one holding arm when this mask is in its closing position closing the housing opening at least partially.

20. The holder according to claim 1, wherein the mask that is associated with the first partial opening, starting out from its opening position, is moveable against a damping mechanism to its closing position whenever the at least one holding arm is brought from its deployed position to its retracted position.

21. The holder according to claim 1, wherein the mask which is associated with the second partial opening, is held by snap fastening in the closed position and is biased in its second direction of movement, the bias force being selected such that this mask carries the other mask toward the opening position.

22. The holder according to claim 1, further comprising a second holding arm having a receiver, wherein the housing receives the two holding arms, the housing opening has another first partial opening with which the third of the three masks is associated, the second partial opening is disposed between the two first partial openings, and the mask associated with the second partial opening is disposed between the masks for the first partial openings.

23. The holder according to claim 22, wherein the mask associated with the second partial opening has the coupling arrangement for the masks for the first partial openings and has the locking arrangement for the holding arms.

24. A motor vehicle, comprising the holder according to claim 1.

25. The motor vehicle according to claim 24, wherein the holder is disposed in a dashboard of the motor vehicle, wherein the holder lies laterally beside an air outlet of an air treatment unit, and wherein in the deployed position of the holding arms at least the receivers are each arranged in front of one of the air outlets.

* * * * *